March 16, 1954     M. ROBERTS     2,671,938
SELF-LOCKING HOOK
Filed April 10, 1952
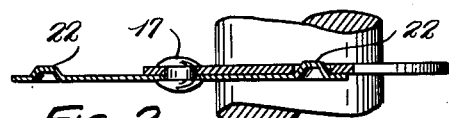
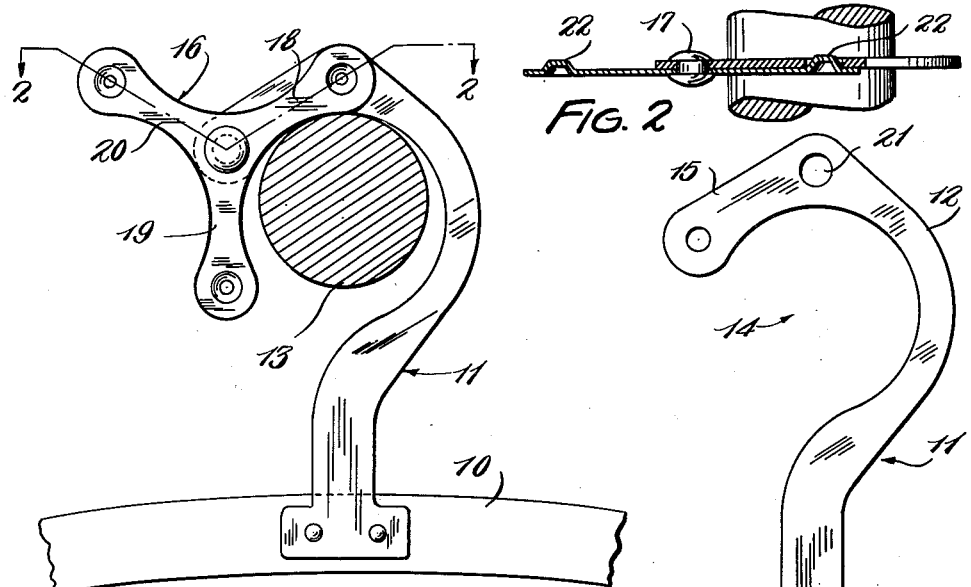
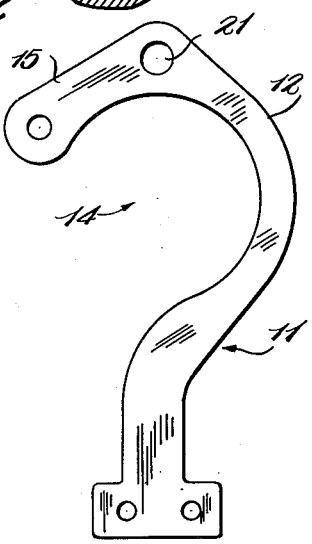
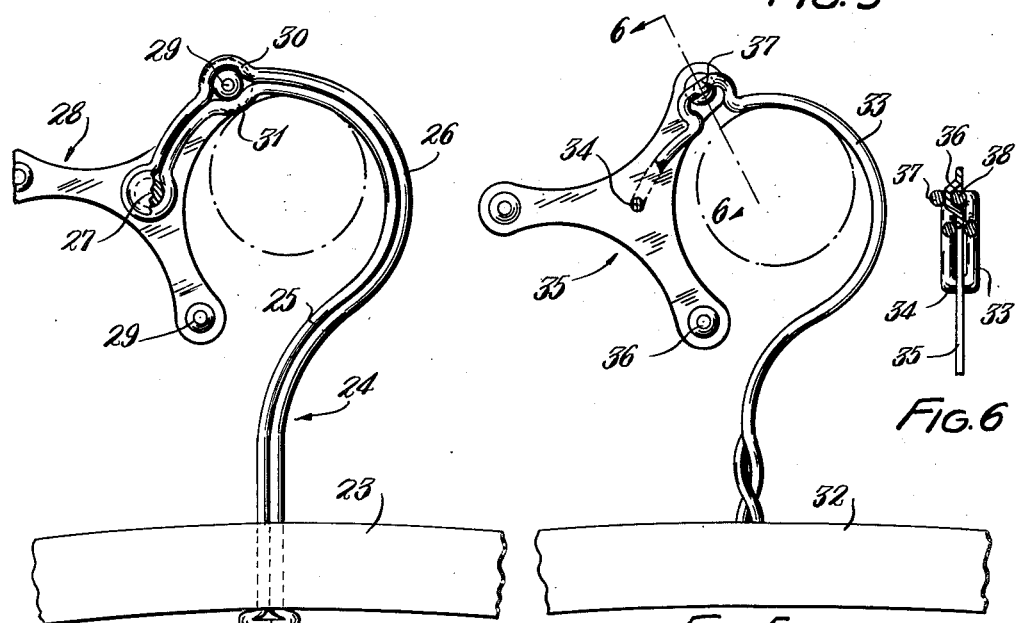
INVENTOR.
MALCOLM ROBERTS
ATTORNEYS Patented Mar. 16, 1954

2,671,938

UNITED STATES PATENT OFFICE 2,671,938

SELF-LOCKING HOOK

Malcolm Roberts, Shaker Heights, Ohio

Application April 10, 1952, Serial No. 281,607

9 Claims. (Cl. 24—241)

This invention relates to a hook structure and, more particularly, to a hook provided with a means preventing its accidental displacement from a supporting member.

An object of the invention is to provide a hook with an improved means for preventing accidental displacement of the hook from a supporting member which means is simple and inexpensive to construct and is reliable in operation.

Another object of the invention is to provide a hook with an improved means for preventing accidental displacement of the hook from a supporting member, which means comprises a multi-arm member pivotally supported adjacent the free end of the hook in a manner such that the member may rotate in either direction and is operable at all times by engagement thereof with a supporting member for the hook.

A further object of the invention is to provide a hook with a multi-arm, turnstile-type member pivotally supported adjacent the outer end of the hook with the spacing between adjacent arms of the member being such that one arm is disposed transversely of the hook opening when an adjacent arm is substantially aligned with the upper or outer portion of the hook, a means being provided to prevent movement of said member except when a rotational force is positively applied against an arm thereof so that accidental displacement of the hook from a supporting member is prevented.

An additional object of the invention is the provision, in a garment hanger, of an improved means for preventing displacement of the hanger from a supporting member which means comprises a turnstile-type member supported for free rotation at the outer end of the hook and having the spacing between the arms of the member such that one arm extends transversely of the hook opening when an adjacent arm is substantially aligned with the upper or outer portion of the hook, a means being provided upon the hook and member to retain one arm thereof in substantial alignment with the said upper or outer portion of the hook until the arm extending across said opening is engaged with an appreciable force acting in a direction to produce rotation of said member.

The invention further resides in certain novel features of the construction and combination and arrangement of parts of the device, and further objects and advantages of the invention will be apparent to those skilled in the art to which it pertains from the following description of the present preferred embodiment thereof, and certain modifications, described with reference to the accompanying drawing, in which:

Fig. 1 is a side elevational view of a garment hanger hook provided with the improved self-locking means of this invention and shown in position on a supporting member or bar;

Fig. 2 is a sectional view taken substantially on the irregular line 2—2 of Fig. 1;

Fig. 3 is a side elevational view of the hook body illustrated in Fig. 1 with the locking means removed;

Fig. 4 is a side elevational view of a modified form of hook provided with the novel locking means of this invention;

Fig. 5 is a side elevational view of a further modified form of the hook provided with the improved locking means of this invention; and Fig. 6 is a fragmentary sectional view taken substantially on the line 6—6 of Fig. 5.

The improved locking means of this invention, for preventing accidental displacement of a hook from a supporting member, may be employed in a variety of different environments and with hooks utilized for different purposes. One of the most frequent occasions for need of such an expedient is, however, in conjunction with garment hangers since the latter, when they are not supporting garments, are easily displaced from the supporting members on which they are resting and/or become entangled with each other and with the clothing supported adjacent thereto, thus causing delays in handling the garments as well as possible damage to the latter. Therefore, while the invention is not limited to use with garment hangers, the principles thereof and the construction of the self-locking mechanism will be hereinafter described in conjunction with use in garment hanger hooks in order to facilitate an understanding of the utility of the invention.

In the presently preferred form of the invention, illustrated in Figs. 1 to 3, the garment supporting member or bar 10 of a garment hanger, which is only fragmentarily shown, is of conventional shape and may be formed of wood, plastic, wire, or any other suitable material, attached to or integral with this garment supporting bar 10 at the center thereof is a hook member 11, which is here illustrated as formed of plate-like material such as sheet metal, plastic or the like. This member has a curved portion 12 provided with the conventional sector shaped inner surface adapted to engage a supporting member, such as the rod or bar 13, access being had to this surface through the usual hook opening 14.

The opening 14 of the hook is relatively large, as in conventional hooks, and consequently only a partial rotation of the hook upon the supporting member or bar 13 would result in displacement of the hook and its attached garment hanger therefrom. In order to prevent this frequently encountered difficulty, the outer or upper part 15 of the hook rotatably supports a multi-arm, turnstile-type member 16 by means of a rivet or the like fastener 17 which extends through a central opening of the locking member 16 and an opening adjacent the outer end of the hook.

The member 16 is provided with equally spaced, radially extending arms such as 18, 19 and 20. The number of arms on the member 16 may be greater than three but the spacing between the arms should be such that when one of the arms, such as 18, is in substantial alignment with the upper or outer portion 15 of the hook, the next adjacent arm, in a clockwise direction as viewed in the drawings, will extend transversely of the hook opening 14, see Fig. 1. It will be evident, therefore, that one of the arms, such as 19, is always disposed transversely of the opening 14 when the hook is supported upon a bar, rod or other supporting means 13, the length of the arms being such that they prevent passage of the supporting member even though the hook and hanger be rotated about the supporting member 13.

The hook locking means or member 16 is held in its operative position, as shown in Fig. 1, by a suitable means which prevents accidental displacement of the member from that position unless an appreciable force be applied in a direction for producing rotation of the member about its pivot. This retention means may be provided by a variety of different expedients as, for example, by friction between the member and hook due to a relative tight securing of the rivet or other fastening member 17. Preferably, however, relatively free rotation is provided at the pivot and a separate detent means is provided to effect the proper retention of the member 16. In the preferred form this detent is effected by providing an opening or recess 21 in the upper portion of the hook adjacent the path of movement of the outer ends of the arms of member 16. Each of the arms of the member 16 is then provided with a protuberance, such as 22, which protuberances are adapted to sequentially engage within the opening or recess 21, as shown in Fig. 2, and thereby prevent rotation of the member 16 until an appreciable force is applied thereto. The protuberances 22 may be provided by any conventional means as, for example, by dimpling or drawing the material of the arms of the member 16 if the latter be formed of metal or by molding or casting if the member 16 be formed of plastic.

The construction of the improved locking means 16 is such that it is always properly positioned for use in effecting a locking action with respect to a supporting member whether the hook be then disposed on a supporting member or be removed therefrom. Thus, in the position shown in Fig. 1, the hook is resting upon a supporting member or bar 13 with the result that the arm 18 has been moved to substantial alignment with the portion 15 of the hook so that the protuberance 22 on that arm is in engagement with the recess or opening 21 of the hook. Consequently, the arm 19 is located so as to extend transversely of the opening 14 to the hook and, therefore, the hanger cannot be displaced from the supporting member 13 by a chance engagement therewith.

The hook 11 and its garment hanger 10 may be removed from the supporting member by moving the hook transversely relative to the supporting member 13 in a manner such that the latter engages the depending arm 19 of the locking member 16, sufficient force being exerted on the hanger to displace the protuberance 22 from the opening 21 and cause rotation of the member 16 in a clockwise direction as viewed in the drawing. It will be understood that the locking member 16 has sufficient inherent resiliency to provide the necessary flexing to permit the protuberances 22 to snap into and out of the opening 21 in the manner described.

When the garment hanger is to be again placed upon a supporting member, it need only be presented to that member in the conventional manner since this causes the latter to engage one of the arms of the locking member 16 and rotate the said locking member in a counter-clockwise direction, as viewed in the drawing, until the hook has come to rest on the supporting member 13. In this position of the hook, the arm of the locking member 16 which was thus engaged will have been moved into substantial alignment with the portion 15 of the hook so that the protuberance 22 thereon engages in the opening 21. Hence, the locking member 16 is again positively held from accidental rotation and prevents accidental displacement of the garment hanger from its supporting member or rod 13.

It will be observed that the locking member 16 may be rotated one or more complete revolutions in either direction. Consequently, if the garment hanger should be removed from its supporting member and the member 16 rotated an amount in addition to that necessary to effect such removal, this will not affect the ease with which the hook of the garment hanger may be again placed upon a supporting member. This is due to the fact that the member 16 has three or more equally spaced arms so that it is only necessary to engage that arm of the member 16 which is adjacent the hook opening 14 with the supporting member 13 on which the hanger is to be placed to effect operation of the locking means as just described. It will be evident, therefore, that the hook locking means 16 is always properly positioned for operation. Moreover, such operation is effected by simply engaging the hook with the supporting member in the usual manner and does not require special positioning or manipulation.

The improved hook locking means may be embodied in hook structures other than that shown in Figs. 1 to 3. For example, the improved locking means may be employed with a hook member formed of wire. Thus, as shown in Fig. 4, a garment supporting member 23 is provided with the hook member 24 formed by bending a single piece of wire to a substantially hook shape so that there are two portions 25 and 26 adjacent each other and disposed in substantially the same vertical plane. Adjacent the free or outer end of the hook the two wire portions 25 and 26 are spaced sufficiently to provide a central opening in which is received the pivot pin or rivet 27 for a hook-locking member 28. The member 28 is constructed in the same manner as described in conjunction with Figs. 1 to 3 and has a plurality of arms equally spaced from each other with each provided, adjacent its outer end, with a protuberance 29. The protuberances 29 are sequentially receivable within an opening provided in the upper portion of the hook 27 by bending one or both of the portions 25, 26. As shown, both portions 25 and 26 have been bent in the region adjacent the path of the protuberances 29 to provide cooperating semi-circular offsets, indicated 30 and 31 in Fig. 4. The operation of this form of hook and locking means is the same as has been previously described and hence need not be repeated.

Figs. 5 and 6 illustrate a still different embodiment of the invention as applied to a garment hanger and in this form the garment supporting member 32 is provided with a hook 33 formed from a loop of wire with a substantially U-shaped bend at the outer or free end so that the hook has two adjacent portions of the wire in side-by-side relationship as will be apparent from Fig. 6. The transverse or bight portion 34 of the U-shaped bend at the outer end of the hook provides the pivotal support for the locking member 35 which is preferably constructed in the same manner as the members 16 and 28. Consequently, this member likewise has a plurality of equally spaced arms each provided adjacent its outer end with a protuberance 36. The protuberances 36 each extend outwardly at one side of the member 35 and are hollow on the other side, and the portions of the wire forming the hook 33 are laterally kinked or bent, as indicated at 37 and 38 in Fig. 6, to cooperate with the combination protuberances and recesses or hollows on the member 35 for retaining the latter against accidental displacement. As in the previous embodiments, the member 35 prevents accidental displacement of the garment hanger from the supporting member with which it is engaged and, when the hanger is removed from the supporting member, the locking member is at all times properly positioned for movement to locking engagement with the supporting member and does not need a special "cocking" or other manipulation.

For convenience in disclosing the invention, the improved self-locking hook has been described and illustrated as applied to garment hangers. It will be apparent, however, that the improved hook may be utilized in other environments wherever similar problems are encountered. Moreover, while the locking member has been shown as having three equally spaced arms, it will be apparent that in some instances a greater number of arms may be employed. Also, it will be apparent that the necessary retention of the locking member in a position preventing displacement of the hook from a supporting member may be effected by means other than the cooperating protuberance and recess or opening as disclosed herein. These and other modifications will be readily apparent to those skilled in the art to which this invention pertains and, consequently, are considered as encompassed within the ambit of the invention which is limited only by the spirit and scope of the subjoined claims.

Having thus described the invention, I claim:

1. A hook having in combination therewith a turnstile-type member rotatably supported on the free end thereof in a manner permitting a complete revolution of said member and with the distance between the arms of said member being such that one arm extends transversely of the opening of said hook whenever another arm thereof is disposed adjacent to and substantially aligned with the upper portion of the hook, whereby presentation of said hook to a supporting member causes the latter to engage an arm of said turnstile member at the entrance of said hook and effect partial rotation of the turnstile member until the outer end of the engaged arm is substantially aligned with the upper portion of said hook when the latter comes to rest upon said supporting member whereupon a succeeding arm of said turnstile member is disposed transversely of the entrance to said hook so that accidental displacement of the hook from the supporting member is prevented.

2. A hook having in combination therewith a turnstile-type member rotatably supported on the free end of the hook in a manner permitting a complete revolution of said member and with the distance between the arms of said member being such that one arm extends transversely of the opening of said hook whenever another arm thereof is disposed adjacent to and substantially aligned with the upper portion of the hook, and cooperating laterally interfitting surfaces provided upon said hook and each of the arms of said turnstile member preventing rotation of said member until a positive force is applied thereto, whereby presentation of said hook to a supporting member causes the latter to engage an arm of said turnstile member at the entrance of said hook and effect partial rotation of the turnstile member until the outer end of the engaged arm is substantially aligned with the upper portion of said hook when the latter comes to rest upon said supporting member whereupon a succeeding arm of said turnstile member is disposed transversely of the entrance to said hook so that accidental displacement of the hook from the supporting member is prevented.

3. A hook as defined in claim 2 and wherein the said interfitting surfaces comprise a recess on the upper portion of the hook and a cooperating protuberance on each arm of said turnstile member.

4. A self-locking hook comprising a first member having a hook-shaped portion, a multi-arm laterally resilient member centrally pivoted to said first member on the free end of the hooked-shaped portion thereof in a manner permitting free revolution of said first member in either direction adjacent to and parallel with the hook-shaped portion of the first member, the distance between the arms of said multi-arm member being equal and such that one arm extends transversely of the opening of said hook-shaped portion of the first member whenever another arm is disposed substantially in alignment with the upper portion of the hook-shaped portion, and laterally interengaging surfaces on said members preventing rotation of said multi-arm member until a positive force is applied thereto, whereby engagement of the hook-shaped portion of the first member with a supporting member causes the arm of said multi-arm member at the entrance of said hook-shaped portion to rotate until it is substantially aligned with the upper portion of said hook-shaped portion when the latter is resting upon said supporting member thereby bringing a succeeding arm of said multi-arm member to a position where it extends transversely of the entrance to said hook-shaped portion so that accidental displacement of the hook from the supporting member is prevented.

5. A self-locking hook as defined in claim 4 and wherein the said interengaging surfaces comprise an opening in the first member adjacent the path of rotation of the arms of said multi-arm member, and a lateral protuberance on each of the arms of the latter member positioned for sequential entrance into said opening.

6. A self-locking hook comprising a length of wire having two parallel portions bent to form a hook, a multi-arm member centrally pivoted to said hook on the outer end thereof in a manner permitting free revolution of said member in either direction and with the distance between the arms of said member being such that one arm extends transversely of the opening of said hook whenever another arm thereof is disposed substantially in alignment with the upper portion of the hook, each arm of said member having a portion adjacent the outer end thereof shaped to be engaged with a transversely deflected portion of the wire comprising the upper portion of said hook to prevent rotation of said member until a positive force is applied thereto, whereby an arm of said member is always retained at the entrance of said hook preventing inadvertent displacement of the hook from a uspporting member.

7. A self-locking hook as defined in claim 6 wherein the wire forming said hook is bent adjacent the outer end thereof to provide a substantially central opening in which is disposed a pivot member for said multi-arm member.

8. A self-locking hook as defined in claim 6 wherein the wire comprising said hook is bent at the outer end of the latter to provide a transversely extending portion on which the said multi-arm member is rotatably mounted for movement of the arms of the latter between the two parallel portions of the wire comprising the hook.

9. In a garment hanger, a hook for suspending the hanger from a support, a multi-arm member centrally pivoted to said hook at the free end thereof in a manner permitting complete revolution of the member in either direction adjacent to and parallel with said hook, the distance between the arms of said member being such that one arm extends transversely of the opening of said hook whenever the outer end portion of another arm thereof is substantially in alignment with the upper portion of the hook, and laterally interengaging surfaces on said hook and each arm of said member to retain an arm of said member with its outer end portion in substantial alignment with the upper portion of said hook until a rotating force is applied to said member, whereby the said member is effective at all times to permit placing the hanger upon a support and a supported hanger is prevented from accidental displacement from its support.

MALCOLM ROBERTS.

References Cited in the file of this patent

UNITED STATES PATENTS

| Number | Name | Date |
|---|---|---|
| 546,226 | Cook | Sept. 10, 1895 |
| 1,193,536 | Gerstner et al. | Aug. 8, 1916 |
| 1,485,630 | Seward | Mar. 4, 1924 |
| 2,164,941 | Rentchler | July 4, 1939 |